Patented June 27, 1950

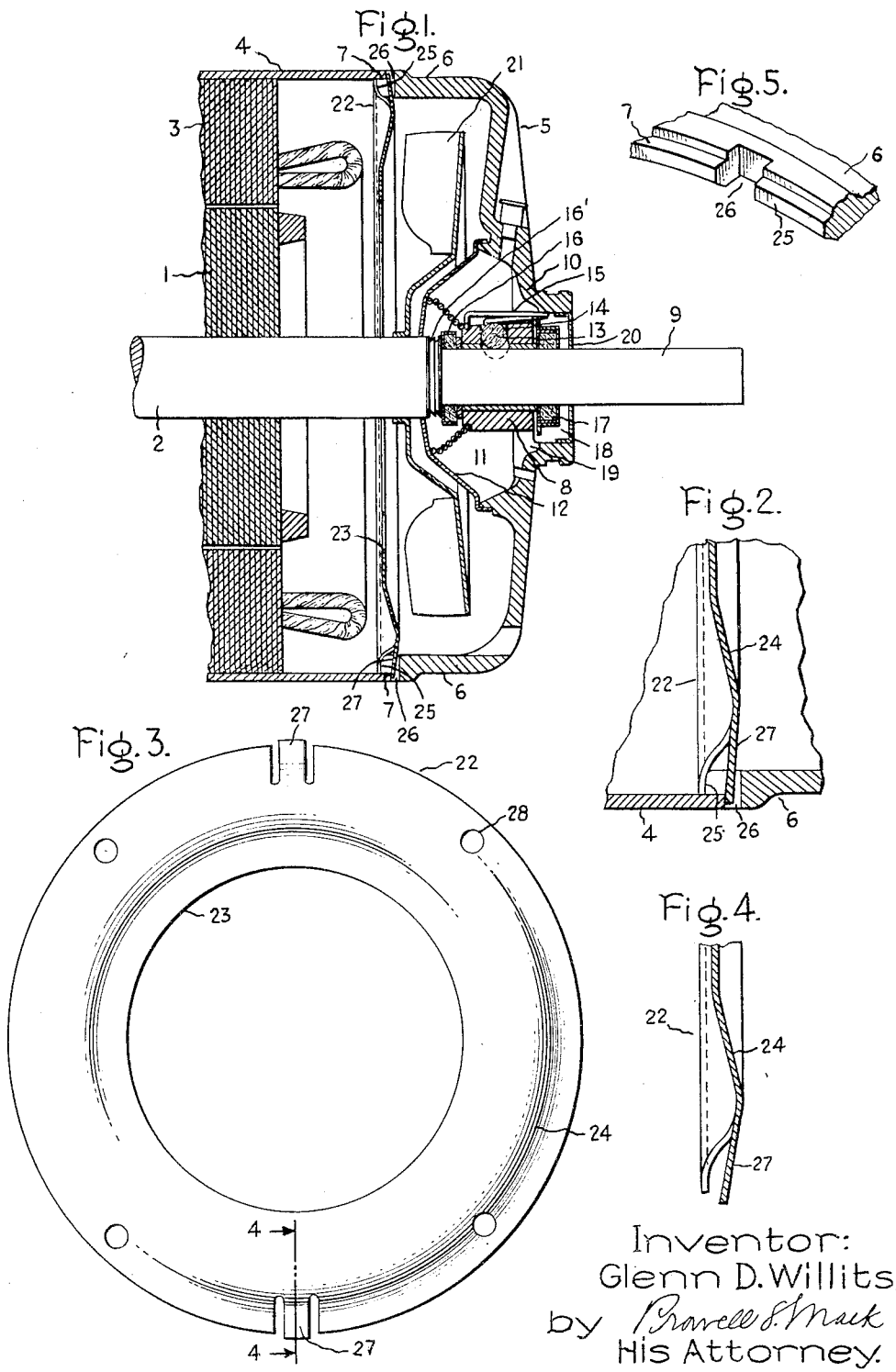

2,512,905

UNITED STATES PATENT OFFICE 2,512,905

BAFFLE AND END SHIELD ASSEMBLY FOR DYNAMOELECTRIC MACHINES

Glenn D. Willits, Grabill, Ind., assignor to General Electric Company, a corporation of New York Application December 30, 1948, Serial No. 68,224

8 Claims. (Cl. 171—252)

This invention relates to the assembly of a baffle in a container and more particularly to an improved baffle and end shield assembly for fan-cooled dynamoelectric machines.

In the design of fan-ventilated dynamoelectric machines, particularly in the fractional horsepower frame sizes, it is desirable to provide an annular baffle for directing the cooling medium to the fan. Such baffle members have customarily been assembled on the end shield of the machine by means of screws or a press-fit. This arrangement, however, necessitates the complete assembly of the end shield, rotor, shaft, fan, and baffle prior to the positioning of the rotor in the stator and in addition, such a baffle is difficult to remove. It is, therefore, desirable to provide a baffle which is readily assembled and disassembled and which will have a self-locking connection with the machine on the final assembly of the end shield to the stator shell.

An object of this invention is to provide an improved baffle mounting for containers.

Another object of this invention is to provide an improved baffle and end shield assembly for dynamoelectric machines.

A further object of this invention is to provide an improved baffle and end shield assembly for dynamoelectric machines wherein the baffle is provided with a self-locking connection when the end shield is secured to the stator shell.

Further objects and advantages of this invention will become apparent and the invention will be better understood by reference to the following description and accompanying drawing. The features of novelty which characterize this invention will be distinctly pointed out in the claims annexed to and forming a part of this specification.

In accordance with this invention, an end shield is provided having an annular flange portion with a rabbet formed on the outer periphery thereof for aligning the end shield with the stator shell. The flange portion is provided with a plurality of slots in the edge thereof extending beyond the rabbet. An annular baffle member is positioned within the shell abutting the edge of the end shield. The baffle member has a plurality of spring ears formed from its outer portion and spaced from its outer periphery. These ears extend beyond the outer periphery of the baffle member and are positioned in the slots in the edge of the end shield flange portion and bear against the end of the stator shell. Thus, the baffle member is securely held in place by a self-locking connection when the end shield is secured to the stator shell.

In the drawing, Fig. 1 is a side elevational view, partly in section, illustrating the improved baffle and end shield assembly of this invention; Fig. 2 is a fragmentary view showing the relative positions of the outer periphery of the baffle member and the spring ears; Fig. 3 is an end view of the improved baffle member of Fig. 1; Fig. 4 is a cross sectional view taken along the lines 4—4 of Fig. 3; and Fig. 5 is a fragmentary view illustrating the slots in the edge of the flange portion of the end shield member of Fig. 1.

Referring now to the drawing, there is shown a fractional horsepower dynamoelectric machine having a rotor member 1 mounted on a shaft 2. A stator member 3 surrounds the rotor member 1 and is mounted in a shell member 4. An end shield 5 is provided having an annular flange portion 6 with a rabbet portion 7 formed on its outer periphery for aligning the end shield with the stator shell 4. The end shield 5 is provided with a bearing 8 for rotatably supporting the extension 9 of the shaft 2. A bearing housing portion 10 is formed on the end shield 5 and defines with the bearing 8 a lubricant reservoir 11 which is closed by a cup member 12. A lubricating wick 13 is fitted in a transverse opening 14 in the bearing 8 and serves to feed lubricant from the reservoir 11 to the shaft extension 9. The lubricant feeding wick 13 is resiliently urged onto the journal surface of the shaft extension 9 by the spring member 15. A lubricant thrower 16 and a plurality of lubricant throwing grooves 16' formed on the shaft 2 serve to throw centrifugally, back into the reservoir 11, the lubricant which travels along the shaft in the direction of the rotor 1. Any lubricant which travels along the shaft in the opposite direction is thrown by a lubricant thrower 17 into the cavity 18 where it is returned to the reservoir 11 through a lubricant return passage 19. The cavity 18 is closed by a cap member 20 which is apertured to receive the shaft extension 9. A fan member 21 for ventilating the machine is positioned within the end shield 5 and is secured to the shaft 2.

In order to direct the cooling medium to the fan 21, an annular baffle member 22 is provided. The baffle member 22 has a central opening 23 which is larger than the outside diameter of the rotor member 1 and smaller than the outside diameter of fan 21. The annular portion of the baffle member 22 has a bowed cross section with the high portion 24 extending toward the end shield member 5. The baffle member 22 is positioned within the shell member 4 and abuts the edge 25 of the flange portion 6 of the end shield 5. A plurality of slots 26 are formed in the edge 25 of the flange portion 6 extending beyond the rabbet portion 7. Thus, when the end shield 5 is assembled on the stator shell 4, there is a small space between the end of the shell member 4 and the base of the slot 26. The baffle member 22 is provided with a plurality of projections or spring ears 27 formed from the outer portion of the baffle member. Holes 28 are provided in the baffle member 22 to receive through-bolts (not shown) which secure the end shield 5 to the shell 4. The spring ears 27 extend outward from the bow 24 and are spaced from the outer periphery of the baffle member 21. The spring ears 27 extend beyond the outer periphery of the baffle member 22 and are positioned in the slots 26 extending into the space beyond the end of the shell 4. Thus, when the baffle member 22 is positioned in the shell 4 and the end shield 5 is assembled on the shell, the spring ears 27 will bear against the end of the shell member 4. It can now be readily seen that when the baffle member 22 and the end shield member 5 are assembled with the shell member 4, the edge 25 of the flange portion 6 of the end shield 5 is tending to force the baffle member 22 into the interior of the machine against the spring pressure of the spring ears 27 which bear against the end of the shell member 4. Thus, the baffle member 22 is securely held in place by a self-locking connection when the end shield member 5 is secured to the shell member 4.

In the assembly of the end shield 5 and the baffle member 22, the stator member 3 with the shell member 4 secured thereto is preferably placed on end and the baffle member 22 is placed on the end of the shell member 4, being supported thereon by the spring ears 26. In this position, the outer periphery of the baffle member 22 will be within the shell member 4. The rotor member 1 mounted on the shaft 2 is then inserted through the opening 23 in the baffle member 22 and the fan 21 is secured to the shaft 2 on the exterior of the baffle member. The end shield 5 is then slipped over the shaft extension 9 so that the spring ears 27 of the baffle member 22 slide through the slots 26 of the flange portion 6. As the rabbet portion 4 of the end shield 5 is forced into engagement with the shell member 4, the edge 25 bears against the baffle member 22 against the spring pressure of the spring ears 27 which are engaging the edge of the shell member 4. Thus, when the end shield 5 is secured to the shell member 4, the baffle member 22 is securely held in place by a self-locking connection. However, if it is desired to disassemble the end shield 5, the baffle 22 does not remain affixed to either end shield 5 or the shell member 4 and can be readily removed.

It will now be readily seen that this invention provides an improved baffle and end shield assembly whereby the assembly and disassembly of the machine is greatly facilitated. It will also be readily apparent that this invention is not limited to a dynamoelectric machine and the improved baffle and end shield assembly can be utilized with any container having a closure.

While I have illustrated and described a specific embodiment of this invention, further modifications and improvements will occur to those skilled in the art. I desire that it be understood, therefore, that this invention is not limited to the embodiment shown and I intend in the appended claims to cover all modifications within the spirit and scope of this invention.

What I claim as new and desire to secure by Letters Patent of the United States is:

1. In a dynamoelectric machine comprising a rotor member, a stator member, a shell member surrounding said stator member, and a fan for ventilating said dynamoelectric machine; an end shield member having an annular flange portion adapted to be secured to said shell member, said flange portion have a plurality of slots formed in the edge thereof, and an annular baffle member for guiding the cooling medium to said fan, said baffle member being positioned abutting said edge of said flange portion, said baffle member having a plurality of projections formed thereon spaced from the outer periphery thereof, said projections being positioned in said slots and bearing against the end of said shell member whereby said baffle member is securely held in place by a self-locking connection when said end shield is secured to said shell member.

2. In a dynamoelectric machine comprising a rotor member, a stator member, a shell member surrounding said stator member, and a fan for ventilating said dynamoelectric machine; an end shield member having an annular flange with a rabbet portion formed on its outer surface for aligning said end shield member with said shell member, said flange having a plurality of slots formed in the edge thereof extending beyond said rabbet portion, and an annular baffle member for guiding said cooling medium to said fan, said baffle member being positioned abutting said edge of said flange, said baffle member having a plurality of projections formed thereon spaced from the outer periphery thereof, said projections being positioned in said slots and bearing against the end of said shell member whereby said baffle member is securely held in place by a self-locking connection when said end shield is secured to said shell member.

3. In a dynamoelectric machine comprising a rotor member, a stator member, a shell member surrounding said stator member, and a fan for ventilating said dynamoelectric machine; an end shield member having an annular flange with a rabbet portion formed on its outer surface for aligning said end shield member with said shell member, said flange having a plurality of slots formed in the edge thereof extending beyond said rabbet portion, and an annular baffle member for guiding said cooling medium to said fan, said baffle member being positioned abutting said edge of said flange, said baffle member having a plurality of spring ears formed from the outer portion thereof spaced from the outer periphery of said baffle member and extending beyond said outer periphery, said spring ears being positioned in said slots and bearing against the end of said shell member whereby said baffle member is securely held in place by a self-locking connection when said end shield is secured to said shell member.

4. In a dynamoelectric machine comprising a rotor member, a stator member, a shell member surrounding said stator member, and a fan for ventilating said dynamoelectric machine; an end shield member having an annular flange with a rabbet portion formed on its outer surface for aligning said end shield member with said shell member, said flange having a plurality of slots formed in the edge thereof extending beyond said rabbet portion, and an annular baffle member for guiding said cooling medium to said fan, said baffle member being positioned within said shell member and abutting said edge of said flange, said baffle member having a plurality of spring ears formed from the outer portion thereof spaced from the outer periphery of said baffle member and extending beyond said outer periphery, said spring ears being positioned in said slots and bearing against the end of said shell member whereby said baffle member is securely held in place by a self-locking connection when said end shield is secured to said shell member.

5. In a dynamoelectric machine comprising a rotor member, a stator member, a shell member surrounding said stator member, and a fan for ventilating said dynamoelectric machine; an end shield member having an annular flange with a rabbet portion formed on its outer surface for aligning said end shield member with said shell member, said flange having a plurality of slots formed in the edge thereof extending beyond said rabbet portion, and an annular baffle member for guiding said cooling medium to said fan, said baffle member having a central opening formed therein larger than the outside diameter of said rotor member and smaller than the outside diameter of said fan, said baffle member being positioned within said shell member and abutting said edge of said flange, said baffle member defining a cavity with said end shield member, said fan being positioned in said cavity, said baffle member having a plurality of spring ears formed from the outer portion thereof spaced from the outer periphery of said baffle member and extending beyond said outer periphery, said spring ears being positioned in said slots and bearing against the end of said shell member whereby said baffle member is securely held in place by a self-locking connection when said end shield is secured to said shell member.

6. In a dynamoelectric machine comprising a rotor member, a stator member, a shell member surrounding said stator member, and a fan for ventilating said dynamoelectric machine; an end shield member having an annular flange with a rabbet portion formed on its outer surface for aligning said end shield member with said shell member, said flange having a plurality of slots formed in the edge thereof extending beyond said rabbet portion, and an annular baffle member for guiding said cooling medium to said fan, said baffle member having a central opening formed therein, the annular portion of said baffle member having a bowed cross section, said baffle member being positioned within said shell member and abutting said edge of said flange with said bowed section extending toward said end shield member, said baffle member having a plurality of spring ears extending outward from said bowed section spaced from the outer periphery of said baffle member and extending beyond said outer periphery, said spring ears being positioned in said slots and bearing against the end of said shell member whereby said baffle member is securely held in place in self-locking connection when said end shield is secured to said shell member.

7. In combination, a shell member, a closure member having a flange portion adapted to be secured to said shell member, said flange portion having a plurality of slots formed in the edge thereof, and a baffle member positioned abutting said edge of said flange portion, said baffle member having a plurality of deformable projections formed thereon spaced from the outer periphery thereof, said projections being positioned in said slots and bearing against the end of said shell member whereby said baffle member is securely held in place by a self-locking connection when said closure member is secured to said shell member.

8. In combination, a shell member, a closure member having a flange portion adapted to be secured to said shell member, said flange portion having a plurality of slots formed in the edge thereof, and a baffle member positioned abutting said edge of said flange portion, said baffle member having a plurality of deformable projections formed thereon spaced from the outer periphery thereof, said projections being positioned in said slots and bearing against the end of said shell member whereby said baffle member is securely held in place solely as a result of the tension due to the deformation of said projections when said closure member is secured to said shell member.

GLENN D. WILLITS.

REFERENCES CITED

The following references are of record in the file of this patent:

UNITED STATES PATENTS

| Number | Name | Date |
| --- | --- | --- |
| 1,120,325 | Miraldi | Dec. 8, 1914 |
| 1,551,236 | Carter | Aug. 25, 1925 |
| 1,578,918 | Powell | Mar. 30, 1926 |
| 2,021,255 | Eggleston | Nov. 19, 1935 |
| 2,198,125 | Nelson | Apr. 23, 1940 |